UNITED STATES PATENT OFFICE.

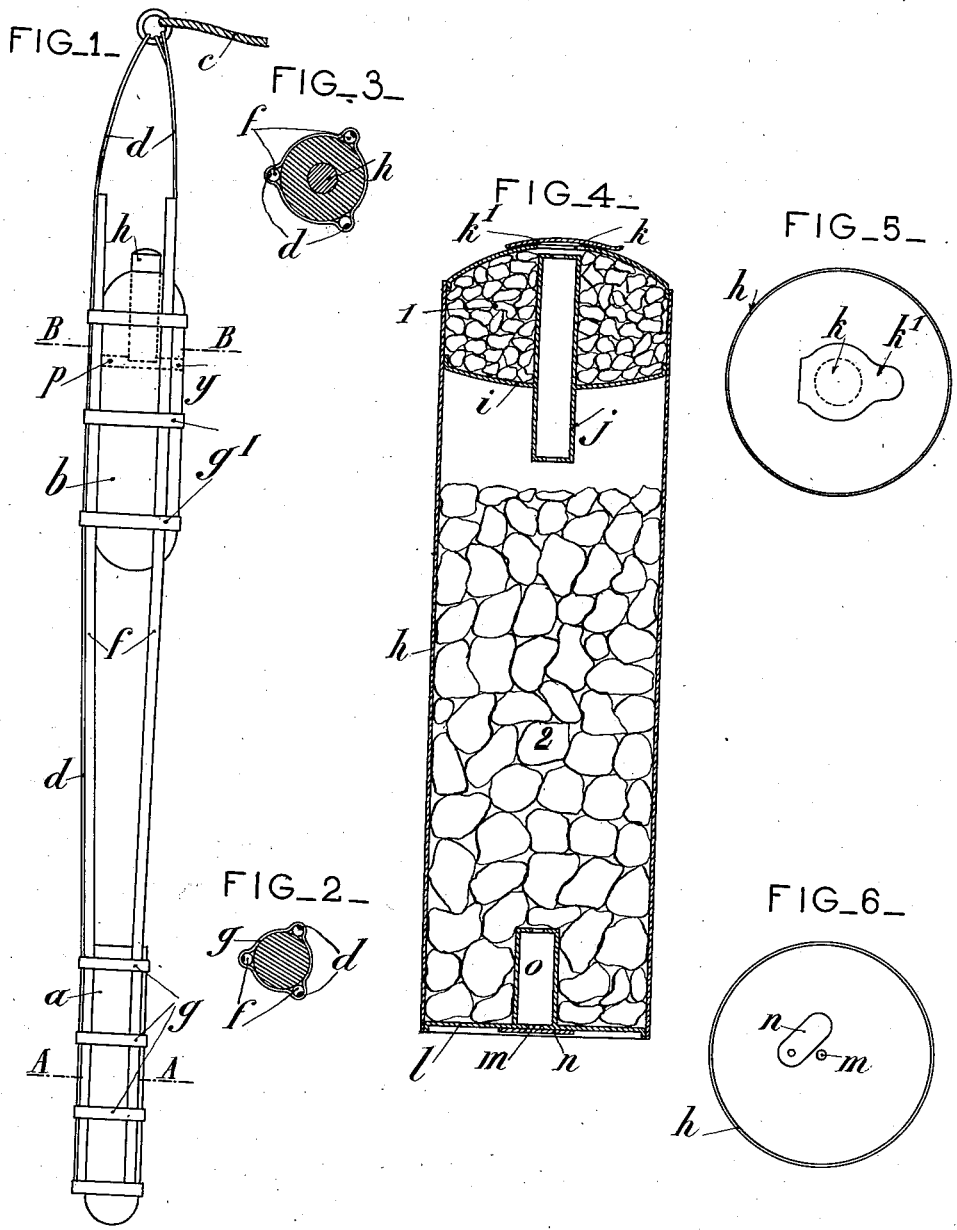

HENRI EMILE ALEXANDRE GUÉRARD, OF GRAVILLE STE. HONORINE, FRANCE.

FLOATING AND LUMINOUS LINE-CARRYING ROCKET.

947,904.  Specification of Letters Patent.  Patented Feb. 1, 1910.

Application filed July 21, 1909. Serial No. 508,865.

*To all whom it may concern:*

Be it known that I, HENRI EMILE ALEXANDRE GUÉRARD, citizen of France, residing at 23 Rue Dubocage, Graville Ste. Honorine, Seine-Inférieure, in the Republic of France, have invented new and useful Improvements in Floating and Luminous Line - Carrying Rockets, of which the following is a specification.

This invention relates to an improved rocket intended to be sent from a ship in distress to another ship or life boat and characterized by the following points: (a) The rocket is attached to a line which it drags with it and which serves to establish communication between the two ships, (b) the rocket is made to float, by the addition of a cork buoy, (c) immediately the rocket falls in the water a light is produced which is very vivid and very visible at night, while in day time the column of smoke which is produced makes it easily perceivable.

A method of making the floating and luminous line carrying rocket consists in fixing to an ordinary metallic rocket, a cork buoy carrying a carbid of calcium reservoir, which carbid on contact with the water gives off acetylene gas maintained constantly ignited by a capsule containing phosphid of calcium which ignites on contact with water. The rocket and the buoy are conveniently connected to a line which serves to establish communication between the two ships.

The annexed drawing shows by way of example a form of construction of the floating and luminous cable carrying rocket established according to the invention.

Figure 1 is a view of the whole. Figs. 2 and 3 are sections made respectively on the lines A—A and B—B of Fig. 1. Fig. 4 is a longitudinal section on a larger scale of the illuminating apparatus. Figs. 5 and 6 are respectively a view of the top and a view of the bottom of the apparatus shown in Fig. 4.

As shown in Fig. 1, 2 and 3, the floating and luminous line carrying rocket is composed of an ordinary metallic rocket $a$ charged with a composition capable of drawing the cork float $b$ and the line $c$ attached to the float and the rocket $a$ by three metallic lines $d$ $d$. These three lines are placed on three wooden sticks $f$ which are fixed to the rocket $a$ by rings $g$ and to the buoy $b$ by rings $g^1$. The rocket thus constructed is fired from a support of metal or wood which can be inclined in the desired direction. In its projection the rocket draws the line $c$ which is sufficiently long (220 to 240 meters). When the rocket falls in the water the part $a$ which is metallic maintains the said rocket in a vertical position, the buoy $b$ forming a float. It is in the upper part of this buoy $b$ where the luminous apparatus shown in detail in Figs. 4, 5 and 6 is lodged. This apparatus is composed of a cylindrical receptacle $h$ divided in two unequal compartments 1 and 2 by a tight partition $i$ carrying a tube $j$ which issues near the orifice $k$ of the upper wall of the receptacle $h$ which orifice is blocked by a thin soldered plate $k^1$. The compartment 2 contains carbid of calcium and the compartment 1 phosphid of calcium. The receptacle $h$ is closed at its lower part by a bottom $l$ provided with an orifice $m$ closed by a small rotary plate $n$. This orifice is surmounted by a tube $o$.

The receptacle $h$ described above is arranged in the float $b$ as shown in Fig. 1 in such a way that its lower part carrying the bottom $l$ comes into a conduit $p$ made transversely in the float $b$.

When one wishes to make use of the rocket above described, the receptacle $h$ is introduced into its housing after having removed the obturator $k^1$ and turned the plate $n$ to free the orifice $m$. The whole is placed on the stand and the rocket $a$ is ignited so as to project the whole in the desired direction. Immediately the rocket reaches the water, the water passes into the two compartments 1 and 2. The carbid of calcium gives off acetylene gas which passing by the tube $j$ is ignited at the opening $k$ by the phosphid of calcium which has the property of igniting in contact with water. Each time that the acetylene gas is extinguished by any cause it is immediately relighted by the phosphid of calcium which is constantly alight.

A feature of especial importance in connection with the present invention is found in the fact that when the rocket strikes the water in case it has missed the ship for which it is intended, ignition of the acetylene gas will take place which at night will cause a bright light or during the day time, a column of smoke will rise, thus indicating the position of the rocket and permitting the ship for which it was intended to secure the same. The line carrying rocket could also in case of need drive along a life belt of cork or other suitable material, which would permit of saving a wrecked person incapable of reaching the coast or the boat. In this event, the belt would be formed of cork washers of about 90 m/m of diameter perforated at their center and shifted on a cord of about 1 m. 50 in length these washers being numerous enough to form a weight of about one kilogram, which is sufficient to support a man in the water.

Having now described my invention, what I claim as new and desire to secure by Letters Patent is:

1. A rocket intended to be fired from a ship in distress to another ship or life boat comprising in combination an ordinary metallic rocket $a$, a cork float $b$, sticks $f$ connecting the rocket to the float, rings $g$ $g^1$, adapted to secure respectively said sticks to the rocket and float, metallic lines $d$ attached respectively to said sticks, a life line $c$ attached to the metallic lines, and a luminous apparatus, mounted at the top of the float, substantially as described and for the purpose set forth.

2. A rocket intended to be fired from a ship in distress to another ship or life boat, comprising in combination an ordinary rocket $a$, a cork float $b$, a receptacle $h$ mounted at the top of the float and divided into two unequal compartments, the top and small compartment of which is adapted to contain phosphid of calcium while the bottom and large compartment is adapted to contain carbid of calcium, a tube $j$ extending from the top of the lower compartment to the top of the upper compartment, an orifice $m$ formed at the bottom of the lower compartment, an orifice $k$ at the top of the upper compartment, and a line attached to the float, substantially as described and for the purpose set forth.

In testimony whereof I have signed my name to this specification in the presence of two subscribing witnesses.

HENRI EMILE ALEXANDRE GUÉRARD.

Witnesses:
 LOUIS BEZANNAY,
 JOHN PRESTON BEECHER.